United States Patent [19]
Brifaud et al.

[11] Patent Number: 5,486,592
[45] Date of Patent: Jan. 23, 1996

[54] COPOLYOXADIAZOLES OF BLOCK TYPE AND PROCESS FOR THEIR SYNTHESIS

[75] Inventors: Thierry Brifaud, Aizenay; Jean-Marc Sage, Oullins, both of France

[73] Assignee: Elf Atochem S.A., France

[21] Appl. No.: 256,899

[22] PCT Filed: Jan. 12, 1994

[86] PCT No.: PCT/FR94/00037

§ 371 Date: Oct. 6, 1994

§ 102(e) Date: Oct. 6, 1994

[87] PCT Pub. No.: WO94/15994

PCT Pub. Date: Jul. 21, 1994

[30] Foreign Application Priority Data

Jan. 13, 1993 [FR] France .................. 93 00257

[51] Int. Cl.$^6$ .................................. C08G 73/08
[52] U.S. Cl. .............. 528/363; 528/422; 528/423
[58] Field of Search ................... 528/363, 422, 528/423

[56] References Cited

U.S. PATENT DOCUMENTS

| | | | |
|---|---|---|---|
| 3,275,608 | 9/1966 | Montgomery et al. | 528/363 |
| 3,632,560 | 1/1972 | Fan | 528/363 |
| 3,734,893 | 5/1973 | Studinka et al. | 528/363 |
| 3,748,298 | 7/1973 | Dobinson et al. | 528/363 |
| 4,046,731 | 9/1977 | Mortimer et al. | 528/363 |
| 4,054,633 | 10/1977 | Richardson | 528/363 |
| 4,245,085 | 1/1981 | Rosser et al. | 528/362 |
| 4,273,918 | 6/1981 | Rosser et al. | 528/362 |
| 4,487,921 | 12/1984 | Stephens | 528/362 |

FOREIGN PATENT DOCUMENTS 884973 12/1961 United Kingdom .

OTHER PUBLICATIONS

Frazier et al., "Aliphatic polyhydrazides: a new low temperature solution polymerization", *J. Polymer Sci,: Part A*, vol. 2, No. 3, pp. 1137–1145, Mar. 1964.

Idemitsu Kosan KK, Derwent WPI, Access No. 88–180126/26, abstract of JP–A–63 118 331, "High molecular weight polyoxidiazole preparation by condensing dicarboxylic acid and hydrazine sulphate in presence of phosphorus pentoxide and methanesulphonic acid", 1988.

Ueda et al., "Synthesis of poly(1,3,4–oxadiazole)s by direct polycondendsation of dicarboxylic acids with hydrazine sulfate using phosphorus pentoxide/methanesulfonic acid as condensing agent and solvent", *J. Polymer Sci,: Part A*, vol. 26, No. 1, pp. 159–166, Jan. 1988.

*Primary Examiner*—P. Hampton Hightower
*Attorney, Agent, or Firm*—Pennie & Edmonds

[57] ABSTRACT

The present invention provides block copolymers of the formula:

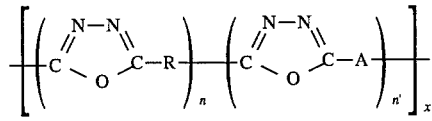

in which R represents an aliphatic residue, A an aromatic residue, x is such that the inherent viscosity (measured in methanesulphonic acid at a concentration of 0.2 g per deciliter at 30° C.) in deciliters per gram is greater than 0.6, and n and n' are greater than or equal to 2. These polymers are made from two different diacids and have two glass transition temperatures, with one glass transition temperature being between −50° and +50° C. and the other glass transition temperature being between 180° and 300° C.

11 Claims, No Drawings

COPOLYOXADIAZOLES OF BLOCK TYPE AND PROCESS FOR THEIR SYNTHESIS

FIELD OF INVENTION

This application is a 371-of-PCT/FR 94/000-37 filed Jan. 12, 1994.

The present invention relates to copolyoxadiazoles of block type of formula:

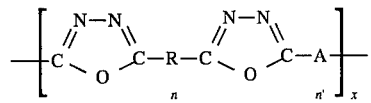

in which:

R represents an aliphatic residue, A an aromatic residue x is such that the inherent viscosity in deciliters per gram is greater than 0.6 n and n' are greater than or equal to 2 and having two glass transition temperatures.

BACKGROUND OF THE INVENTION

H. Frazer (Journal of Polymer Science (A2) pp. 1137–1160 (1964)) has described the synthesis of copolyoxadiazoles by reacting diacid chloride with a dihydrazide derivative of another diacid according to the scheme (1), in sulphuric acid:

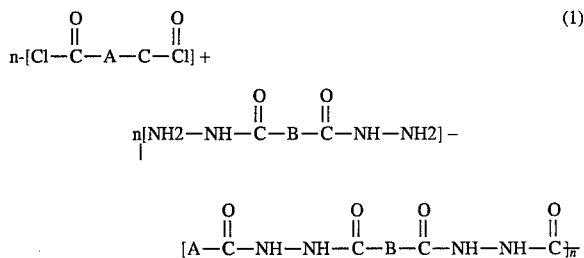

a polyhydrazide is thus obtained, which is isolated and then heat-treated in order to obtain the cyclized oxadiazole form

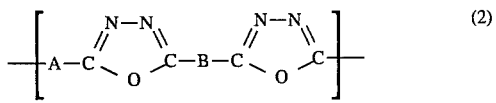

The structure is alternating, with a unit B following a unit A.

Ueda and Sugita (Journal of Polymer Science A26, 159 (1988)) describe the synthesis of polyoxadiazoles in a single step from diacids and hydrazine sulphate in methanesulphonic acid solvent in the presence of phosphoric anhydride.

The polyoxadiazoles obtained from aromatic diacids have a high thermal stability and are materials possessing a high rigidity. However, these materials cannot in general be melted because their melting point is above 400° C.

The introduction of aliphatic segments, by the use of a mixture of aromatic diacids and aliphatic diacids, leads to a reduction in the melting point of the copolyoxadiazoles. Korshak (Vysokomol Soed. B 10(8) 568 (1988) and Polymer Science of USSR 8, 883 (1966)) has prepared copolyoxadiazoles of alternating type, that is to say that the aliphatic units and the aromatic units are alternately distributed.

The melting points are as follows:

| COPOLYMERS | MELTING POINT in °C. |
|---|---|
| 6/I | 180 |
| 6/T | 240 |
| 10/I | 100 |
| 10/T | 220 |

6 and 10 denote the number of carbons in the aliphatic unit, (I) isophthalic acid and (T) terephthalic acid, the aliphatic and aromatic units are separated by the oxadiazole units

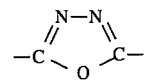

Only one glass transition temperature (Tg) and only one melting point are found for each copolymer.

The Korshak synthesis is effected either by reacting aliphatic dicarboxylic acid dichloroanhydrides with aromatic dicarboxylic acid dihydrazides or by reacting aromatic dicarboxylic acid dichloroanhydrides with aliphatic dicarboxylic acid dihydrazides.

These polyoxadiazoles and copolyoxadiazoles containing alternating aliphatic and aromatic units are either crystalline or amorphous. They do not posses the properties of elastomer materials.

SUMMARY OF THE INVENTION

Copolyoxadiazoles of block type have now been found having two glass transition temperatures and having elastomeric properties.

DETAILED DESCRIPTION OF THE INVENTION

The invention more precisely relates to copolyoxadiazoles of block type of formula:

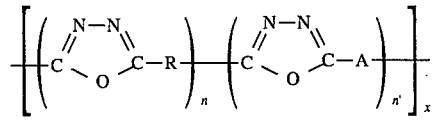

in which:

R represents an aliphatic residue, A an aromatic residue n and n' are greater than or equal to 2 x is such that the inherent viscosity (measured in methanesulphonic acid at 0.2 g per deciliter at 30° C.) in deciliters per gram is greater than 0.6, and having two glass transition temperatures.

For simplicity, the following terms will be used in reference to:

the aliphatic oxadiazole blocks

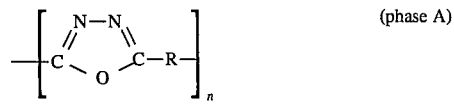
(phase A)

and the aromatic oxadiazole blocks

(phase B)

Various transitions are thus observed on differential thermal analysis, corresponding to the actual transitions Tm and Tg (Tm denotes the melting point) for each of the two phases. This distinguishes them from the copolymers of alternating type, which have only one glass transition temperature (Tg) which is approximately equivalent to the weight average of the Tg's of the two phases A and B.

n and n' are preferably between 3 and 20.

The residue R represents a linear or branched aliphatic chain.

This phase A advantageously has a glass transition temperature (TgA) between $-50°$ and $+50°$ C. and a melting point (TmA) between $+50°$ and $+150°$ C.

R may represent a residue having from 2 to 20 carbon atoms.

R may also represent several aliphatic residues, that is to say that several and various residues R may be within one and the same block.

With regard to the residues A, they are defined from the aromatic diacids by removing the —COOH groups.

These aromatic diacids may be diversely substituted.

Isophthalic acid or its mixtures with terephthalic acid up to a proportion which does not result in crystallization of the phase B is preferred. 4,4'-dicarboxydiphenyl ether and 1,3,5-tris(tertbutyl)isophthalic acid are also preferred, alone or mixed with the iso- and terephthalic acids with the same limitations.

Phase B is characterized by an amorphous state defined by the absence of a melting point after the Tg of the latter, the melting point being detected by DSC analysis as an enthalpy endotherm greater than 2 calories per gram and per C°.

The Tg of these phases B may typically vary from $180°$ to $300°$ C. (TgB).

Compared with the prior art, the copolymers of the invention surprisingly display elastomeric-type properties within a high temperature range. In addition, properties typical of materials with a shape memory have been demonstrated.

It has also been demonstrated that the copolymers of the invention could be shaped by moulding or compression at a temperature greater than or equal to TgB (equivalent to the initial state $S_0$). The material may subsequently be subjected to a temperature between TmA and TgB, a deformation by compression or stretching (100% and more) leading to a deformed state S1 which is stable below TmA.

When this material is heated to a temperature greater than or equal to TmA, it rapidly reassumes its initial dimensional state $S_0$. Several deformation/recuring cycles may thus be performed.

For the copolymers of the invention which do not have a melting point TmA, the deformation operations must be performed below TgA and the recuring (overlapping of the initial state) above TgA.

The copolyoxadiazoles of the invention may be prepared by reacting:

(i) diacid HOOC—A—COOH with (ii) the dihydrazide

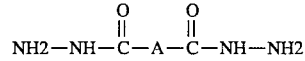

or the diacid HOOC—R—COOH (iii) in the presence of a sulphonic acid and phosphoric anhydride (iv) in the presence of an amount of hydrazine sulphate such that the number of moles of hydrazine plus the number of moles of dihydrazides is at least equal to the number of moles of diacids. That is to say that, if aliphatic dihydrazide alone is used, it is not necessary to add hydrazine.

Although any sulphonic acid can be taken, it is simpler to use methanesulphonic acid.

The dihydrazides may also be prepared in situ by reacting the corresponding diacids with hydrazine sulphate.

EXAMPLES

In the examples which follow the aliphatic part corresponds to HOOC—$(CH_2)_{10}$—COOH and the aromatic part to isophthalic acid.

EXAMPLE 1—EXPERIMENTAL PROCEDURE A:

100 ml of methanesulphonic acid are introduced into a glass reactor fitted with a stirrer. 15 g of phosphoric anhydride ($P_2O_5$), equivalent to 10%, are then added. The temperature is brought to $80°$ C. for 10 min in order to facilitate the dissolution of $P_2O_5$.

The temperature is subsequently brought down to $60°$ C. and the desired mixture of diacids is then introduced, followed by the required amount of hydrazine sulphate.

The reaction mixture is then brought to $90°$ C. for 4 h. At the end of this time, the mixture is cooled to room temperature and then poured slowly into 100 ml of N-methylpyrrolidone. Precipitation of the polymer is then observed, and this is subsequently filtered off, washed with water and then with ethanol, and then dried.

The results are reported in Table 1.

EXAMPLES 2 AND 3—EXPERIMENTAL PROCEDURE B:

The operating conditions are similar to those of Experimental Procedure A except that, in place of the mixture of diacid and hydrazine, the aliphatic diacid is employed in its dihydrazide form, to which the aromatic diacid is added in a stoichiometric amount in the reaction system.

The results are reported in Table 1.

EXAMPLES 4 AND 5—EXPERIMENTAL PROCEDURE C (COMPARATIVE):

The process is performed in an identical manner to Experimental Procedure B described above, this time starting from the dihydrazide of the aromatic diacid:

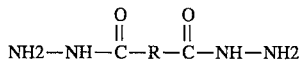

and from the aliphatic diacid.

The total concentration of the diacids in the solvent is 0.5 mol/liter.

The results are reported in Table 1.

| Example | Number of moles R | Number of moles A | TgA (TgB) | TmA | Inherent viscosity | As measured by NMR analysis n | n' |
|---|---|---|---|---|---|---|---|
| 1 | 50 | 50 | $-10°$ C. ($+250°$ C.) | $+100°$ C. | | 3.3 | 3.3 |
| 2 | 75 | 25 | $-0°$ C. ($+220°$ C.) | $+90°$ C. | 1.4 | 13.3 | 4.3 |
| 3 | 50 | 50 | $-10°$ C. ($+255°$ C.) | $+104°$ C. | | 7 | 7 |
| 4 | 50 | 50 | $+40°$ C. | not detected | | 1.4 | 1.4 |
| 5 | 75 | 25 | $0°$ C. | $+90°$ C. | 1.4 | 3 | 1 |

The inherent viscosity (in dl/g) is measured at the concentration of 0.2 g per deciliter of methanesulphonic acid.

We claim:

1. Block copolymers of the formula:

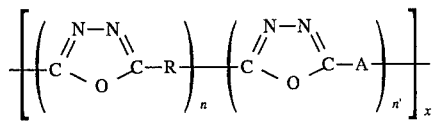

in which

R represents an aliphatic residue, A an aromatic residue x is such that the inherent viscosity (measured in methanesulphonic acid at a concentration of 0.2 g per deciliter at 30° C.) in deciliters per gram is greater than 0.6 n and n' are greater than or equal to 2 and having two glass transition temperatures, with one glass transition temperature being between −50° and +50° C. and the other glass transition temperature being between 180° and 300° C.

2. Block copolymers according to claim 1, characterized in that n and n' are between 3 and 20.

3. Block copolymers according to claim 2, characterized in that R is a residue having 2 to 20 carbon atoms.

4. Block copolymers according to claim 3, characterized in that A is the isophthalic or terephthalic acid residue or their mixture by removal of the COOH groups.

5. A process for the preparation of block copolymers according to one of claims 1 to 4 or 8 to 10 comprising the steps of forming a reaction mixture which comprises (i) the diacid HOOC—A—COOH, (ii) the dihydrazide $NH_2$—NH—C(O)—R—C(O)—NH—$NH_2$ or the diacid HOOC—R—COOH, (iii) a sulphonic acid and phosphoric anhydride, and (iv) an amount of hydrazine sulphate such that the number of moles of hydrazine plus the number of moles of dihydrazides is at least equal to the number of moles of diacids and recovering the block copolymer from said reaction mixture.

6. Process according to claim 5, characterized in that the sulphonic acid is methanesulphonic acid.

7. Process according to claim 6, further comprising the step of preparing the dihydrazides in situ by reaction of the corresponding diacid and hydrazine sulphate.

8. Block copolymers according to claim 1, characterized in that R is a residue having 2 to 20 carbon atoms.

9. Block copolymers according to claim 1, characterized in that A is the isophthalic or terephthalic acid residue or their mixture by removal of the COOH groups.

10. Block copolymers according to claim 2, characterized in that A is the isophthalic or terephthalic acid residue or their mixture by removal of the COOH groups.

11. Process according to claim 5, characterized in that the dihydrazides may be prepared in situ by reaction of the corresponding diacid and hydrazine sulphate.

* * * * *